(12) United States Patent
LaVeine (10) Patent No.: US 7,090,080 B2
(45) Date of Patent: Aug. 15, 2006

(54) FREE WIRE RECLAIMER SYSTEM FOR SCRAP TIRE PROCESSORS

(75) Inventor: Andrew T. LaVeine, Newberg, OR (US)

(73) Assignee: Action Equipment Co., Inc., Newberg, OR (US)

( * ) Notice: Subject to any disclaimer, the term of this patent is extended or adjusted under 35 U.S.C. 154(b) by 356 days.

(21) Appl. No.: 10/345,689

(22) Filed: Jan. 15, 2003

(65) Prior Publication Data

US 2004/0137114 A1    Jul. 15, 2004

(51) Int. Cl.
*B03C 1/00* (2006.01)

(52) U.S. Cl. ............... 209/38; 209/223.1; 209/225; 209/241

(58) Field of Classification Search ............ 209/38, 209/636, 643, 213, 223.1, 225, 231, 241, 209/247, 257, 314, 315, 316, 320, 904, 920; 241/79, 79.1
See application file for complete search history.

(56) References Cited

U.S. PATENT DOCUMENTS

| | | | | |
|---|---|---|---|---|
| 1,082,352 | A | * 12/1913 | Morow | ............ 193/2 R |
| 1,208,880 | A | * 12/1916 | Wright et al. | ............ 209/228 |
| 2,470,889 | A | * 5/1949 | Drescher | ............ 209/214 |
| 3,272,330 | A | * 9/1966 | Nelson | ............ 209/38 |
| 3,672,496 | A | * 6/1972 | Williams | ............ 209/38 |
| 4,055,489 | A | 10/1977 | Soley | |
| 4,337,900 | A | * 7/1982 | Williams et al. | ............ 241/14 |
| 4,738,367 | A | * 4/1988 | Barrett | ............ 209/223.1 |
| 5,230,917 | A | 7/1993 | Peters | |
| 5,341,937 | A | * 8/1994 | Vos | ............ 209/38 |
| 5,464,100 | A | * 11/1995 | Oka | ............ 209/31 |
| 5,797,498 | A | * 8/1998 | Kobayashi et al. | ............ 209/636 |

OTHER PUBLICATIONS

Steinert Electromagnetbau GMBH, "Separation" (catalog), 10 pgs, Steinert Electromagnetbau Gmbh, Koln, Germany, 2001.
EUROCRUSHER, (advertisement), 2001 Pub by Batrer Kurtz.
Recycling Research Institute, "Getting the Wire Out," *Scrap Tire News* (news-letter), Dec. 2002, pp. 1 & 3; Recycling Research Institute, Leesburg, Virginia.
Ohio Magnetics, Inc. / Stearn Magnetics, "Magnet Drum Separators," (webpage), Dec. 12, 2002, Ohio Magnetics, Inc., Maple Heights, Ohio.
Action Equipment Co., Inc., "General Arrangement Grizzly Discharge Conveyor," (drawing of product on sale Jul. 25, 1999, Action Equipment Co., Inc.. Newberg, Oregon.
IPES International, Inc., "Permanent Suspended Magnetic Separators," web page (http://www.ipesmag.com/permanent.html), copyright 2003.
Dings Magnetic Group, "Overhead Magnetic Separators," web page (http://www.dingsmagnets.com/products/Suspended-(Overhead)-Magnets/index.asp), copyright 2002.

* cited by examiner

(Continued)

*Primary Examiner*—Joseph C. Rodriguez
(74) *Attorney, Agent, or Firm*—Chernoff, Vilhauer, McClung & Stenzel, LLP

(57) ABSTRACT

An apparatus for providing free wire reclamation from a granulated stream of mixed metallic and nonmetallic material comprises a vibratory conveyor having a trough assembly mounted on a suspension system and coupled to a motor for causing the suspension system to vibrate. The trough assembly includes upper and lower vibrating troughs extending parallel to one another, the upper trough including at least one gap of a predetermined width. Each trough is arranged so as to feed a different output collection point, and at least one declumping zone comprising at least one perforated deck is situated in-line with the upper and lower troughs. A magnetic separator is arranged above the gap in the upper trough so as to pick up free metal. Rubber granules fall through the gap and are deposited in a receptacle, while metal is deposited on the upper trough which feeds a separate receptacle.

26 Claims, 8 Drawing Sheets

FREE WIRE RECLAIMER SYSTEM FOR SCRAP TIRE PROCESSORS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The following invention relates to a system for liberating metal in processed granulated material that may contain metal parts, such as wire, in a granulated stream of ground-up metallic and nonmetallic components, such as steel belted rubber tires.

Tires are recycled by grinding and shredding the tires to form a granular stream of material. Size reduction machines grind whole tires while downstream devices called "granulators" further reduce particle sizes. Radial tires however, and in particular steel-belted radial tires, contain wire embedded in the rubber. In order to reclaim the wire and rubber in the granulated tires separately, it is necessary to first remove the wire from the rubber in the granulated stream.

Reclaiming rubber and metal wire is a difficult process because even separated chunks of wire and rubber tend to clump together forming interwoven mats, small "birds' nests," and other matrices of wire/rubber material. The rubber and steel mixture discharged from a granulator has been found to be at least 90% separated so that it should be feasible to reclaim the rubber and the wire correspondingly.

Conventionally, tire processors attempt to use cross-belt magnets to pick wire from a stream of material downstream from the output of a granulator. A conventional type of cross-belt magnetic separator is shown in U.S. Pat. No. 5,230,917 to Peters entitled "Method for Separation of Canned Goods and Reclaiming Useful Food Values Therefrom." A different type of magnetic separator is shown in U.S. Pat. No. 4,055,489, Soley, "Magnetic Separator for Solid Waste." Cross-belt magnets that attempt to separate wire from rubber are positioned at a 90° angle to a fluidized wire/rubber stream and attempt to pick the wire out of the stream. However, the mostly fluidized stream of granulated wire and rubber material that enters the magnetic field of the cross-belt magnet frequently becomes magnetized, forming a woven wire matrix with entrapped rubber. In addition to becoming magnetized, the previously separate materials change direction (i.e., make a 90° turn) as they are pulled to the corner of the magnet and are impacted by large cleats commonly found in the conveyor belts that pull the material across the cross-belt magnet. All these factors contribute to the formation of clumps of metallic and nonmetallic material mixed together.

BRIEF SUMMARY OF THE INVENTION

The apparatus of the invention aids in reducing clumping in a granular stream of mixed wire and rubber and separates wire from shredded rubber more efficiently. The apparatus includes a vibrating conveyor assembly that includes upper and lower troughs. An in-line magnetic separator is situated above the vibrating conveyor assembly and attracts metal pieces from the shredded rubber. A belt carries metal pieces attracted to the magnet in the magnetic separator across a gap in the upper trough while rubber pieces are allowed to fall through the gap onto the lower trough. After clearing the gap, metal falls from the belt onto the upper trough. Separation of metal from rubber is further aided by a "declumping" zone which comprises a deck having holes or perforations and which may be placed at a slight incline with respect to the vibrating conveyor assembly. As the material is shaken and falls through the holes, clumps are broken apart and separated which makes it easier for the magnetic separator to lift wire pieces out of the mixed rubber and wire stream.

DETAILED DESCRIPTION OF THE INVENTION

A free wire reclaiming apparatus 10 (refer to FIGS. 1 and 2) includes a frame 12 and a vibrating conveyor assembly 14. The apparatus 10 is fed by a granulator 11 supported by a frame 11a which sits astride the conveyor 14. The conveyor 14 includes a distribution plate 13 (shown in dashed outline). The distribution plate 13 is an angled plate that spreads out the product of the granulator 11 as it drops so that it is dispersed more evenly onto the conveyor 14. The vibrating conveyor 14 is a rigid unit suspended on the frame by spring assemblies 16 that allow the conveyor 14 to vibrate when driven by a motor assembly 18. The motor assembly 18 provides a linear impulse motion of a predetermined stroke length, which determines the amplitude of vibration of the vibrating conveyor 14. Vibratory conveyors of this type are manufactured by Action Equipment Company, Inc. of Newberg, Oreg.

Figure 1:
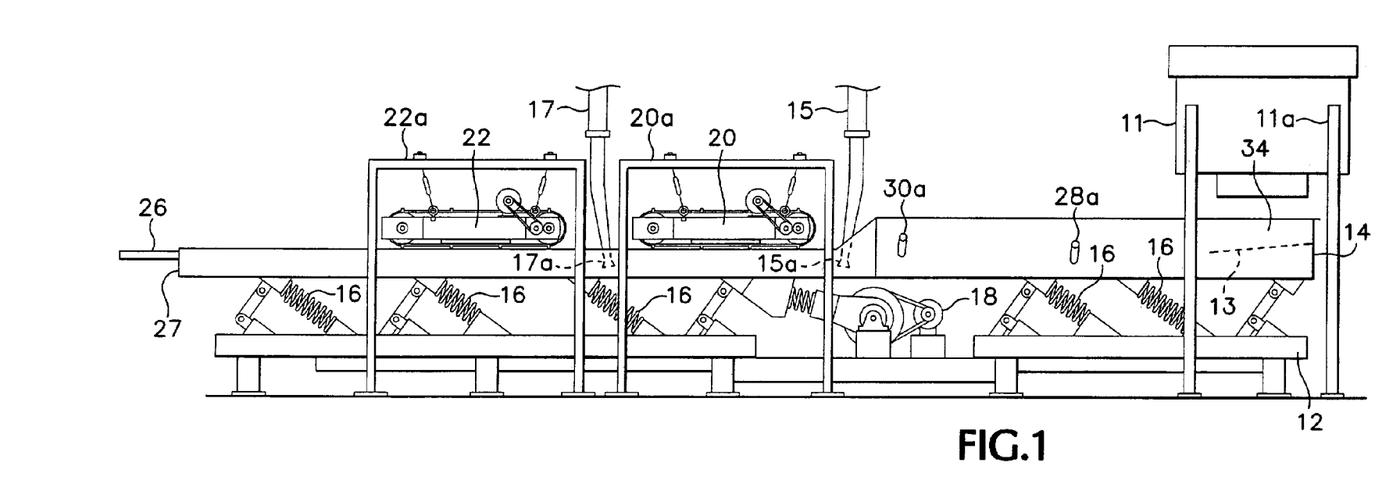
FIG. 1 is a side elevation view of a preferred embodiment of a wire liberating system.
Figure 2:
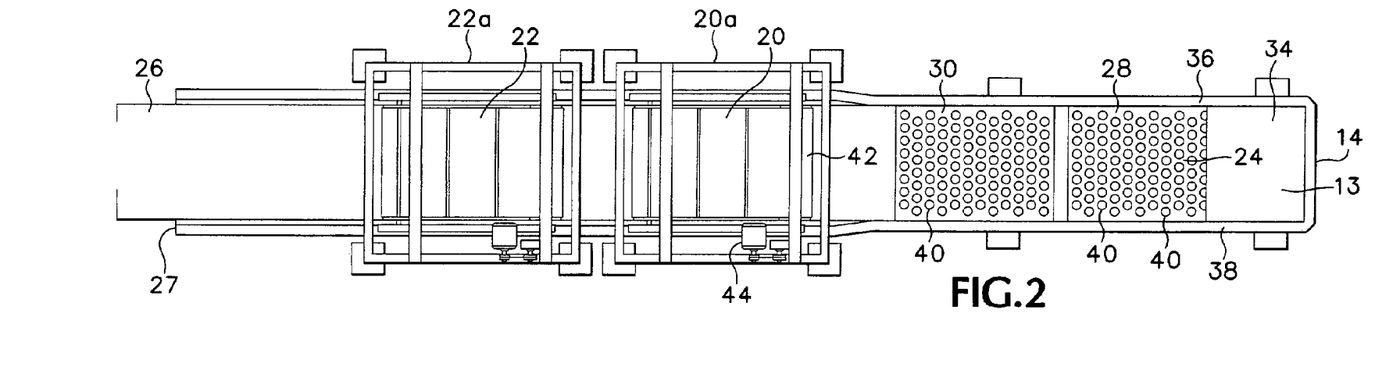
FIG. 2 is a plan view of the apparatus of FIG. 1.

A pair of magnetic separator units 20 and 22 are suspended from respective frames 20a and 22a, respectively. The frames 20a and 22a sit astride the conveyor 14 and its frame 12. The separator units 20 and 22 are situated in-line with the flow direction of conveyor 14 and thus reclaim metallic material from the mixed stream of metallic and nonmetallic material so as to create separate streams flowing in the same direction.

Figure 3:
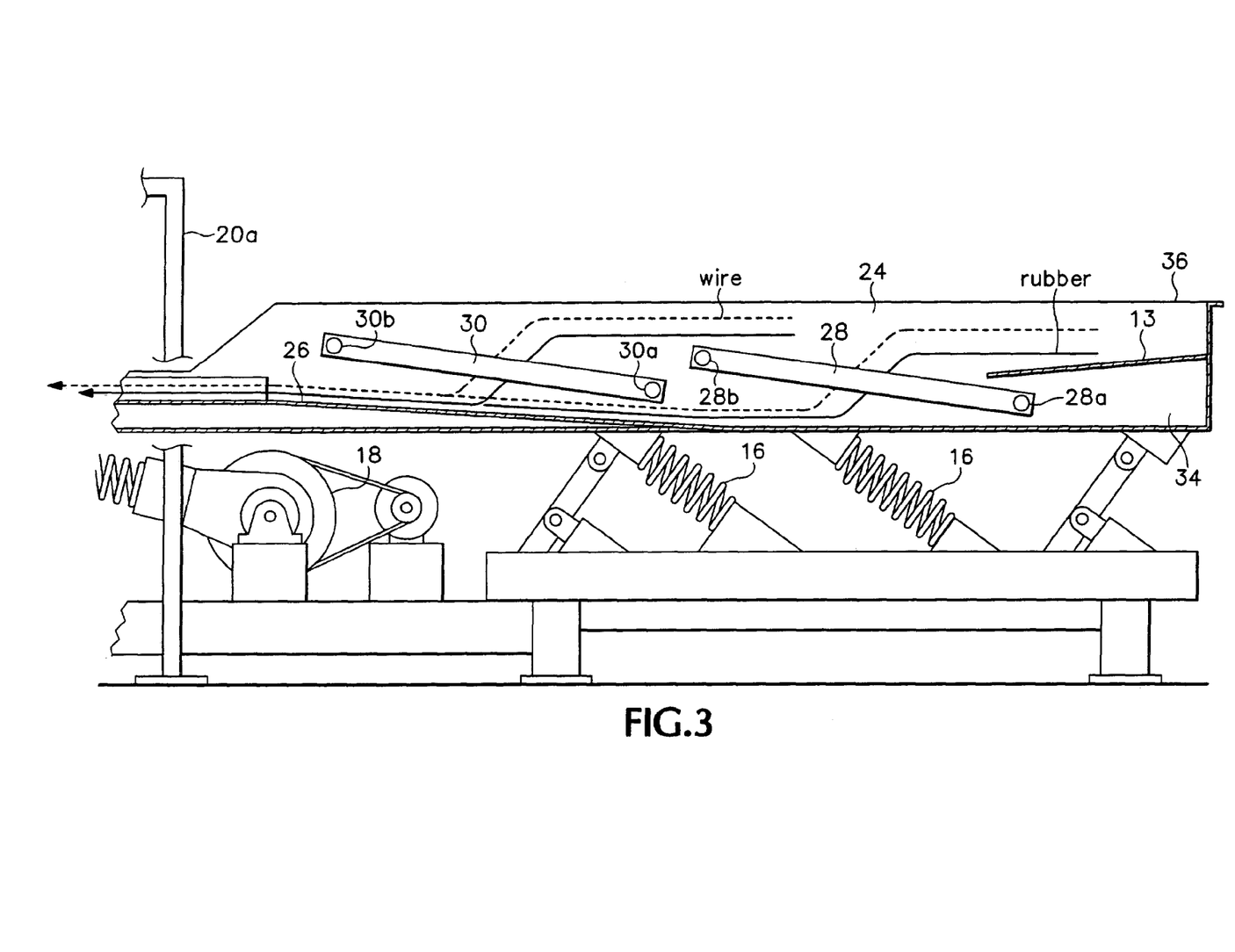
FIG. 3 is a partial side elevation cutaway view of a portion of the apparatus of FIG. 1 illustrating a wire/rubber declumping zone.

FIG. 3 shows the upstream or input end of the separator apparatus 10. The input end will be referred to herein as a "declumping zone" 24. The declumping zone 24 includes a slightly inclined upper trough 26 and a pair of perforated decks 28 and 30. The upper trough 26, which is slightly inclined in the declumping zone 24, becomes horizontal at its output. Sidewalls 36 and 38, which keep material from spilling over, are attached on opposite sides of the upper deck trough 26. A lower trough 27 extends horizontally from the declumping zone 24 all the way to the output of the separator 10.

Granulated material comprising wire (represented by a dashed line) and rubber (represented by a solid line) is deposited onto the distribution plate 13 in an input tray 34. The decks 28 and 30 are both rotatable about respective pivot points 28a and 30a. The decks may be secured at varying angles of inclination at ends 28b and 30b, respectively, which may be affixed to the sidewalls 36 and 38, respectively, of the declumping zone 24. The perforated decks 28 and 30 contain holes or apertures 40 through which separated wire and rubber components are allowed to drop. Under the action of the vibratory deck 14, clumps of mixed wire and rubber material are shaken apart and fall through the perforations 40 in the decks 28 and 30 to form a granular stream of separated wire and rubber (i.e., the components are no longer clumped together). The inclined decks also provide a vertical drop for the material stream from one deck 28 to the next deck 30 and from the deck 30 to the upper trough 26. The entire assembly vibrates and this causes tumbling of the material as it drops. The tumbling effect helps to dislodge and break apart clumps of material. The stream is then conveyed to the next downstream components of the apparatus, the magnetic separators.

Figure 4:
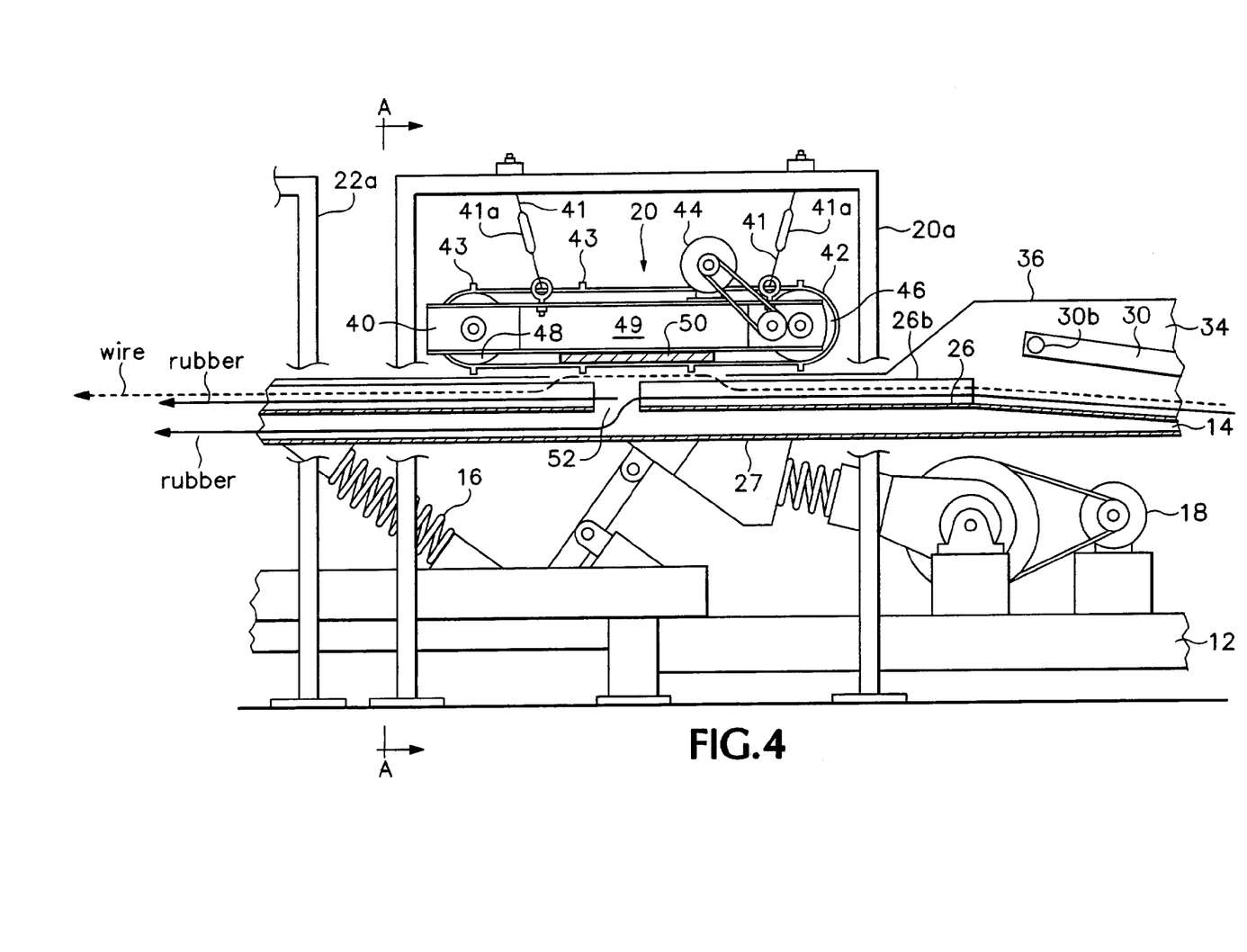
FIG. 4 is a partial side elevation cutaway view of one of the magnet separator units of the apparatus of FIG. 1.

A magnetic separator section 20 is shown in FIG. 4. While there are two such devices shown herein, only the first section 20 will be described in detail because the magnetic separator 22 is identical. The magnetic separator unit includes a motorized endless belt assembly constructed on a frame 49 which is suspended from the frame 20a which sits astride the vibratory conveyor 14. The frame 49 supports a pair of pulleys 46 and 48 which are mounted for rotation on the frame 49. An endless belt 42 extends around the pulleys which are, in turn, driven by a motor 44 so that the belt 42 moves in the direction of material flow along the vibratory conveyor 14. The endless belt 42 is stretched tight between the pulleys 46 and 48 so that it slides over a magnet 50 which is attached to the underside of the frame 49. The magnet 50 may be a single magnet or may be a series of magnets which are dimensioned so as to span the width of a gap 52 which exists in the upper trough 26. The endless belt 42 is fairly taut between the pulleys 46 and 48, and when metallic objects approach the magnet 50, they are attracted toward the magnet. However, because the magnet's field extends through the relatively thin endless belt 42 which slides across it, metal pieces such as wires are held against the endless belt 42 and are, as a result, propelled across the gap 52. The distance between the pulleys 46 and 48 is relatively long, being much longer than either the gap 52 or the lineal length of the magnet 50. For this reason, as soon as the metal pieces (represented by the dashed line in FIG. 4) clear the forward end of the magnet 50, they fall from the belt 42 onto the upper vibratory trough 26. The endless belt 42 also has small transverse cleats 43 which aid in propelling the magnetically attracted material across the gap 52 and onto the upper trough at the other side of the gap. Nonmetallic material such as rubber (as illustrated by the solid line in FIG. 4) is not attracted to the magnet 50 and therefore falls through the gap 52 onto the lower trough 27.

The magnetic separator unit 20 is a modular apparatus that is not physically attached to the vibrating conveyor. A plurality of such separator units may be used in conjunction with the conveyor and it is sometimes advantageous to do so because additional separating steps provide a greater degree of refinement in the process of separating metallic material from nonmetallic material in the stream. Thus, while the application herein shows two such units placed in-line with the vibratory conveyor mechanism, more magnetic separator units may be used if desired.

A feature of each magnetic separator unit is the adjustability of the magnet 50 relative to the upper trough 26. The cables 41 each have a turnbuckle 41a which may be used to raise or lower the frame 49 and hence regulate the distance between the magnet 50 and the upper trough 26. To avoid magnetic linkage between the vibratory conveyor itself and the magnet unit 50, the vibrating troughs should be made of stainless steel, at least within the area of each of the magnetic separator units.

The width of the gap 52 which exists in the upper trough 26 should be made large enough so that nonmetallic material, such as rubber, does not carry over and become inadvertently deposited in the upper trough. If desired, a lip extending upwards may be added to the downstream end of the gap 52 to guarantee that metallic materials do not find their way back into the gap 52 and onto the lower trough 27. In practice, it has been found that a gap width of six to seven inches is optimal for a granulated wire/rubber mixture.

The combined wire and rubber streams (represented by the dashed lines and solid lines respectively) are propelled along the upper trough 26 by the action of the vibratory conveyor 14 as driven by the motor assembly 18. As the wire components approach the magnet 50, they are lifted, held against the endless belt 42 and propelled across the gap 52 aided by the cleats 43. The rubber, which is not magnetized, drops through the gap 52 into the lower trough 27. Some wire and rubber remain mixed however, and this mixture is fed to the second magnetic separator 22.

Figure 5:
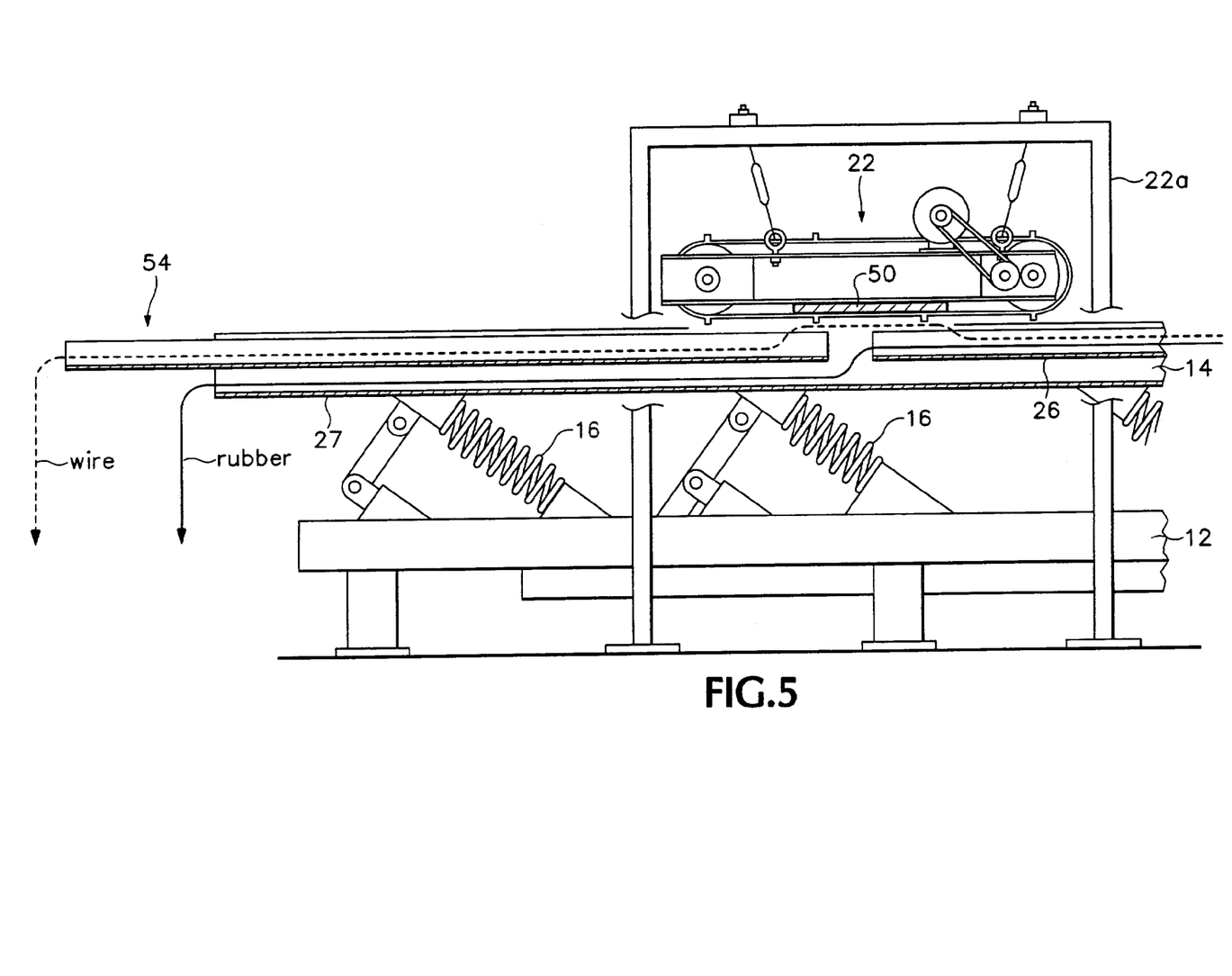
FIG. 5 is a partial side elevation cutaway view of the downstream end of the apparatus of FIG. 1.

Referring to FIG. 5, the second magnetic separator 22 effectively removes most of the remaining wire from the wire/rubber mixture. With most metal/nonmetal mixtures, a high degree of separation can usually be obtained. It should be appreciated that it is difficult to predict the exact percentage of separation between metallic and nonmetallic materials due to the number of variables involved in each potential application. If the separator is to be used for tire processing, the percentages may depend upon the type of tire processed. Truck tires provide a greater degree of separation than do passenger tires. Certain types of passenger tires have differing amounts of steel in the sidewall area and the liberation of metallic components from such sidewalls is difficult because the pliability of the sidewalls requires more mechanical reduction in order to reach the same percentage of separation. Moreover, the age of the tires, tread percentage relative to total weight and the number of other types of tires (for example bias-ply tires) affect the separation percentages. In general, passenger tires have a higher fiber content in the rubber in comparison to truck tires. Thus, the most efficient liberation of metal from nonmetallic components for such tires frequently requires aspiration to dislodge fluffy fiber from the mixture. Aspirators 15 and 17 are provided in FIG. 1 which are suction hoses with laterally elongated vacuum heads 15a and 17a which may span the width of the vibratory conveyor 14. While aspirators 15 and 17 are shown placed before and after the first magnetic separator, the aspiration step could be performed prior to the material entering the declumping zone. The suction hoses remove light fluffy material from the stream which otherwise might become tangled with wire and tend to cause clumps of mixed fibrous, rubber and wire material to form. As many aspirators as necessary may be used. The number of aspirator stages will be determined largely by the amount of fibrous content that is likely to be encountered.

Both wire and rubber components are separated at the output of the second magnetic separator such that most of the rubber is conveyed exclusively by the lower deck 27 while most of the wire is constrained within the upper deck 26. At the output of the separator (generally indicated at 54 in FIG. 5), the wire and rubber may be directed to separate appropriate output receptacles (not shown).

Figure 5A:
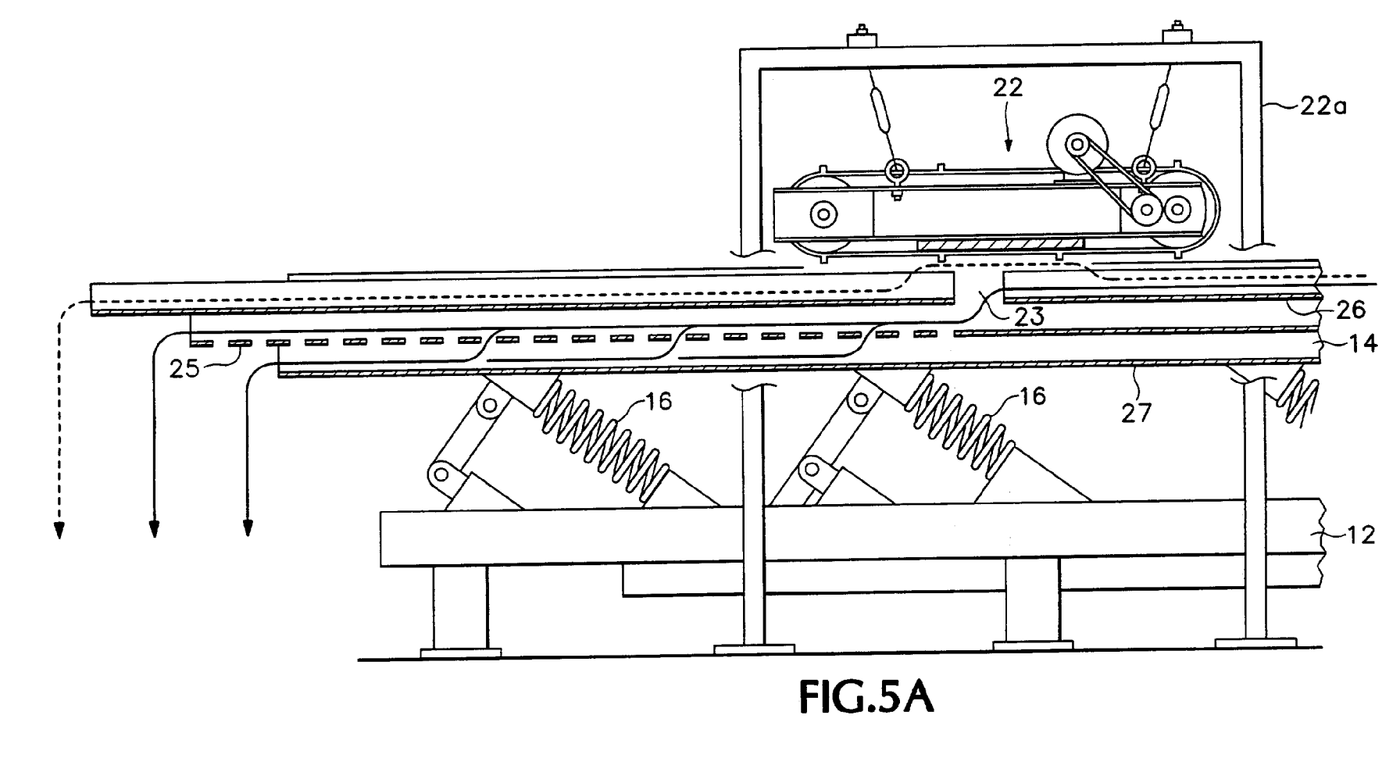
FIG. 5A is an alternative embodiment showing the same view as FIG. 5 but containing a sizing screen.

A variation of the end portion of the apparatus of FIG. 5 is shown in FIG. 5a. In FIG. 5a, in addition to the upper through 26 and lower trough 27, a sizing screen 25 is provided which screens selected sizes of rubber pieces. Smaller pieces of rubber fall through the screen and are collected in an appropriate receptacle (not shown). Larger pieces may then be collected as desired or may be recycled back to the granulator for further size reduction.

Figure 7:
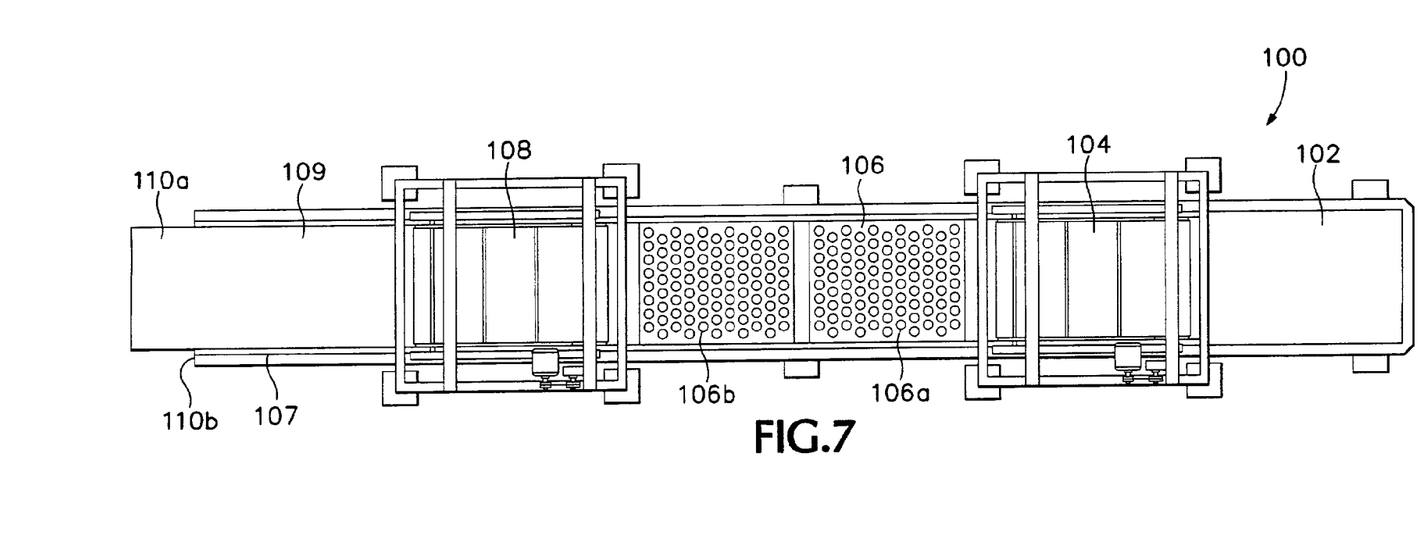
FIG. 7 is a plan view of a second embodiment of the invention in which the declumping zone is placed between two magnetic separator sections.

Referring to FIG. 7, an alternative embodiment of the invention is shown in which the declumping zone is positioned between two in-line magnetic separators. A wire separator apparatus 100 has an input tray 102. Mixed wire and rubber encounters a magnetic separator unit 104 that, at least partially, removes wire from the stream depositing it in an upper vibratory trough 109 while allowing free rubber to fall into a lower vibratory trough 107. The free rubber material in the lower vibratory trough 107 proceeds below the declumping zone 106 while the wire material picked up by the magnetic separator 104 is deposited onto the perforated ramps 106a and 106b of the declumping zone 106. Declumping is necessary due to the effect of the magnetic separator unit 104 that may tend to pick up wire pieces which, when magnetized, form a matrix entrapping free rubber granules. The declumping zone 106 is, in all respects, similar to the apparatus shown in FIG. 3 with the exception that the free rubber granules have been deposited into the lower trough 107 which runs underneath the declumping zone 106. The output of the declumping zone 106 is fed to a second in-line magnetic separator 108. Free rubber granules are deposited in the lower trough 107 while the separated wire is deposited in the upper trough 109. The lower trough 107 feeds to an output end 110b while the upper trough 109 feeds separated wire to the output end 110a. Appropriate collections bins (not shown) are placed below the ends of the upper and lower troughs 107 and 109, respectively.

The apparatus described herein is usually positioned at the output of a granulator. This device is a machine that shreds and grinds pieces of tires that have been previously shredded by size reduction machines. The output of a conventional granulator is typically a ⅜" to ½" chunk of material. The input end 34 of the wire reclaimer system 10 of the invention is narrow in order to fit properly beneath a conventional granulator. If, however, the input to the system comes from a conveyor belt, this may not be necessary. The input may be sized to accommodate differing types of inputs from size reduction machines, granulators or other inputs depending upon the output of the particular apparatus employed.

The vibrating conveyor is made to vibrate by the motor 18 which delivers a periodic linear impulse that is transmitted to the conveyor through a spring. The amplitude of vibration is determined by the length of the stroke of the motor. For optimum use, a relatively long stroke, that is, greater than or equal to one inch, should be used so as to provide sufficient agitation to cause granulated rubber particles to become jarred loose from granulated wire. In addition, the conveyor should be of sufficient length to allow for a long dwell time. Typical separator units of this type may be thirty-five feet long and the length could easily increase to forty or forty-five feet so as to increase the dwell time for more complete and efficient separation. A typical conveyor speed is around sixty feet per minute (60 FPM) in a tire processing application. Other applications for different materials may require different speeds.

In addition, other types of magnetic separators could be used with the apparatus described herein. The particular form of the magnetic separator unit is not critical and magnetic separators which include magnetic drums or clad belts instead of the rubber belt with cleats illustrated in the preferred embodiment may be used. Different types of magnet configurations may be used as well. It has been discovered that magnets with differing orientations with respect to their north-south fields help to agitate magnetic materials as they move close to the field. This causes the magnetic material to snap or jump abruptly toward the magnets in the separator unit so as to help dislodge non-magnetic chunks of material which might otherwise be trapped between pieces of metal. Also, the conveyor belt speed of the magnetic separator units should be made to be relatively fast. A conveyor belt speed of up to four hundred feet per minute is recommended.

Certain features in the declumping zone or zones provide adjustability for optimum performance. The perforated decks 28 and 30 are inclined with respect to the horizontal plane which can be defined as the bottom of the conveyor. The amount of inclination is variable. It has been found that the optimum angle of inclination of the perforated decks is about 5°, but the angle may range from 5° to 15° depending upon placement (flat vs. angled), conveyor speed and other factors. A longer declumping zone provides more dwell time and hence additional untangling of rubber granules from wire.

Figure 5B:
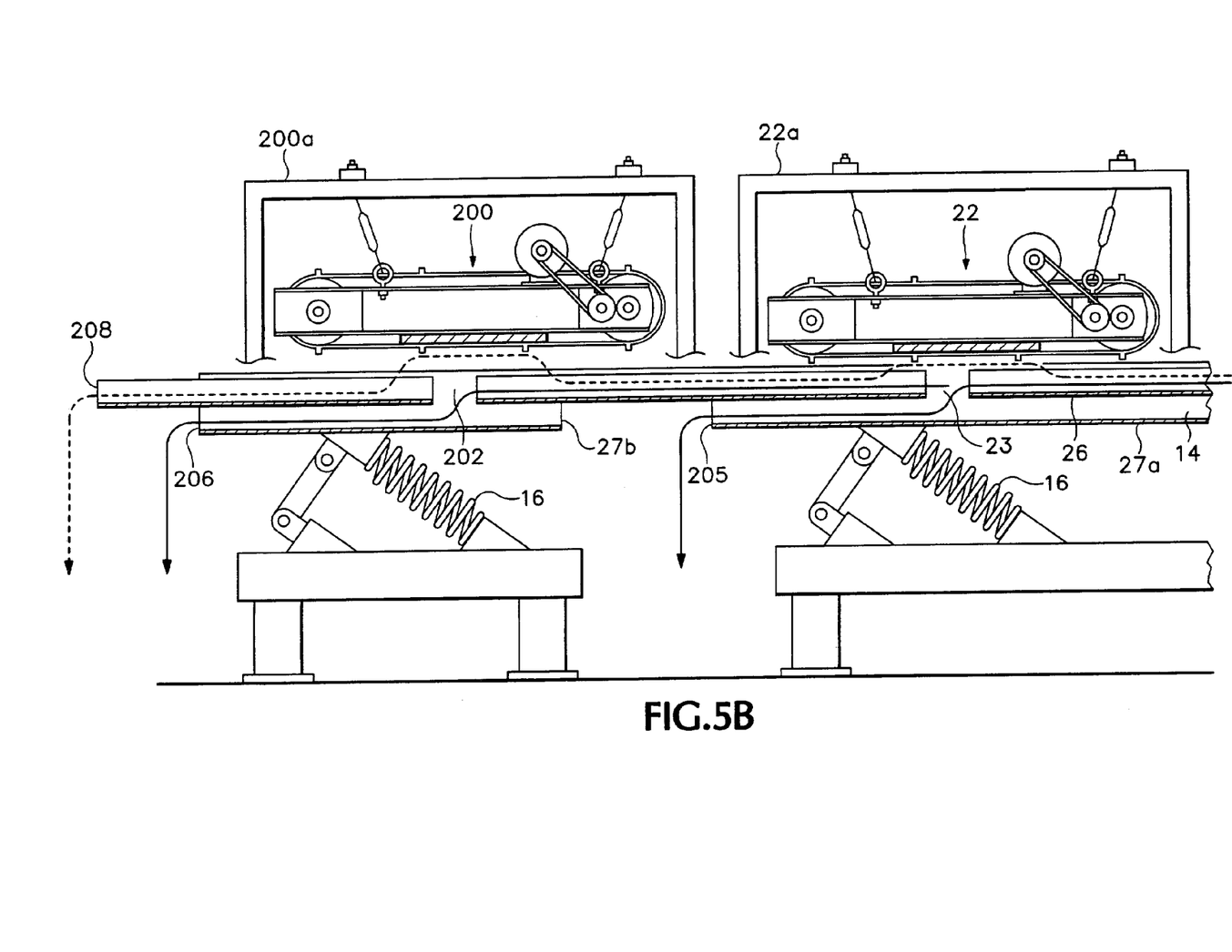
FIG. 5B is a side elevation view of an alternative embodiment using three in-line magnetic separators.
Figure 6:
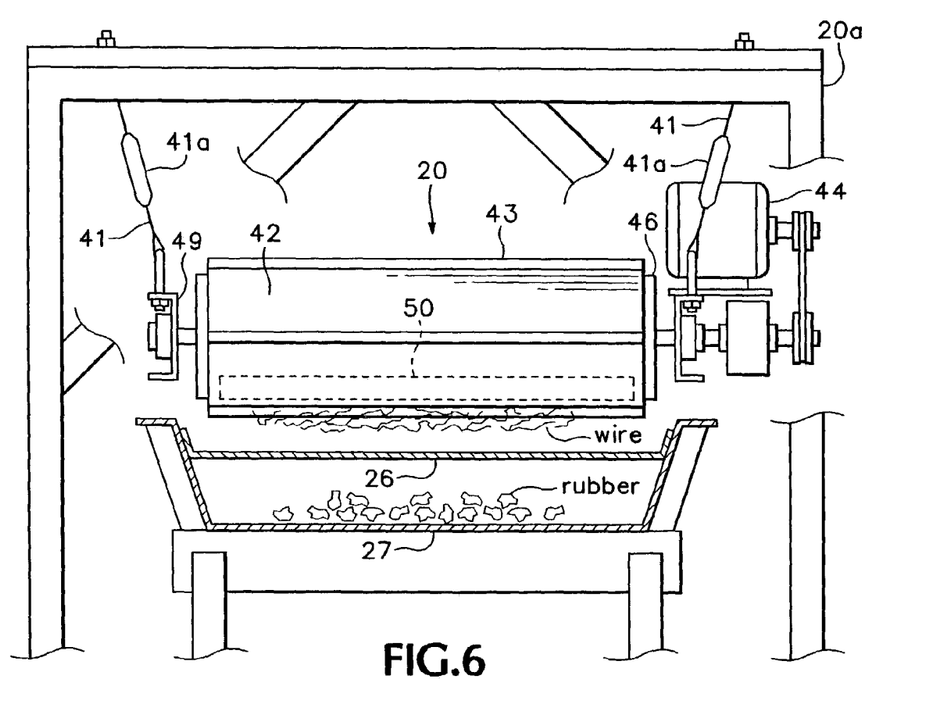
FIG. 6 is a cutaway end view of the apparatus of FIG. 1 taken along line A—A.

Another desirable feature is the adjustability of the magnets and the magnetic separators relative to the vibratory conveyor. Making the magnets adjustable in height above the upper trough permits field tuning. The magnet can be raised, if desired, to ignore potentially small pieces of wire that could be embedded in a rubber granule. In a tire processing application, heights from three inches to nine inches above the upper trough represent a preferred range, but this parameter may vary depending upon the materials in the stream, the speed of the conveyor and the degree of separation between metal and nonmetal prior to reclamation of metal by the magnetic separator units. Thus, a further embodiment of the free wire reclaimer system is shown in FIG. 5B. Like FIG. 5A, the apparatus of FIG. 5B is an alternative to the downstream end of the system which is illustrated in FIG. 5. The difference between the system configuration of FIG. 5B and system configurations of FIG. 5 and FIG. 5A is that in FIG. 5B there is a third magnetic separator assembly 200 mounted on a frame 200a. Further, there are separate lower troughs 27a and 27b which sit beneath the gaps 23 and 202 which are positioned beneath the magnetic separators 22 and 200 respectively. In operation, the embodiment of FIG. 5A operates almost the same as the embodiments of FIGS. 1 and 7. The embodiment of FIG. 5A also provides, however, for the reclamation of rubber with some entrained steel. The magnetic separators 20 and 22 are set at a height that is relatively close to the bed of the upper trough 26—approximately three to five inches. This setting insures that all material with any metal, including not only free wire but rubber with entrained wire, is picked up and conveyed along the upper trough 26. This allows only nonmetallic clean rubber to fall through a rubber discharge port 204 which is an output of the lower trough 27a. The third magnetic separator 200 is set at a height of seven to nine inches so that only free metal will be picked up. Rubber pieces with some entrained metal will fall through the gap 202 onto the lower trough 27b. From this point, the rubber with entrained steel may be conveyed through an output port 206. Thus, the output end 208 of the upper trough contains only clean steel. The material reclaimed at output port 206 may be recycled to the granulator for further processing to liberate more of the metal from the rubber, then deposited back in the input 34.

While the preferred embodiment has been described herein as especially useful for separating components of tires, the invention is not limited to tire processing applications. Virtually any process which produces metallic and nonmetallic components in a mixed stream may make use of the invention.

I claim:

1. An apparatus for separating metals from nonmetals in a granular stream comprising:
    (a) a vibratory conveyor including a trough assembly suspended on springs and a motor for causing a vibration of the trough assembly to thereby move material in a predetermined direction of material flow and having:
        (i) a first conveyor section including at least one perforated deck coupled to the trough assembly, the perforated deck having apertures of a predetermined size, and
        (ii) a second section including an upper trough having at least two sections substantially horizontally aligned and a lower trough extending substantially parallel to the upper trough sections placed downstream of the first conveyor section, the upper trough having one or more gaps of a predetermined width between said sections so as to permit material to fall onto the lower trough, and
    (b) a magnetic separator positioned above each of said one or more gaps in said upper trough and comprising each a magnet member and an endless belt moving in said direction of material flow relative to said vibratory conveyor, the endless belt positioned so as to slide over the magnet member, the magnet member being positioned above and spanning the width of each said gap in said upper trough.

2. The apparatus of claim 1 wherein the first conveyor section includes at least a pair of perforated decks, each of said perforated decks being pivotally mounted to said trough assembly and having a range of adjustment about a pivot point so as to permit said decks to be upwardly inclined.

3. The apparatus of claim 1 wherein said second section further includes a vibratory sizing screen extending beneath a gap in said upper trough and above said lower trough.

4. The apparatus of claim 1 wherein said endless belts include cleats or ridges.

5. The apparatus of claim 1 further including a size reducing machine positioned to deposit material onto said vibratory conveyor at said first conveyor section.

6. The apparatus of claim 5 further including a distribution plate for distributing material evenly to said first conveyor section from said size reducing machine.

7. The apparatus of claim 1 wherein said at least one perforated deck is inclined at an angle to a horizontal plane.

8. The apparatus of claim 1 further including at least one aspirator positioned above said vibratory conveyor for extracting fibrous material.

9. The apparatus of claim 1 wherein said upper trough includes at least two gaps.

10. An apparatus for separating metallic material from a granulated stream of mixed metallic and nonmetallic material comprising:
    (a) a vibratory conveyor comprising a trough assembly mounted on a suspension system and coupled to a motor for causing the suspension system to vibrate and thereby move material in a predetermined direction of material flow, the trough assembly including:
        (i) upper and lower vibrating troughs extending parallel to one another, and conveying said material in said predetermined direction, the upper trough including at least a pair of gaps of a predetermined width, each of said troughs being arranged so as to feed a different output collection point,
        (ii) at least one declumping zone comprising at least one perforated deck situated in-line with said upper and lower troughs, and
    (b) at least a pair of magnetic separators arranged above said gaps in said upper trough wherein each of said magnetic separators comprises an endless belt sliding across a magnetic member in said direction of material flow positioned so as to span the width of a gap in said upper trough.

11. The apparatus of claim 10 wherein said endless belt includes cleats or ridges.

12. The apparatus of claim 10 wherein said declumping zone is positioned between said pair of magnetic separators.

13. The apparatus of claim 12 wherein said declumping zone comprises at least a pair of perforated deck elements.

14. The apparatus of claim 13 wherein said pair of perforated deck elements each have a slight angle of inclination with respect to a horizontal plane.

15. The apparatus of claim 14 wherein said angle of inclination is adjustable.

16. The apparatus of claim 10 further including a vibratory sizing screen situated above said lower vibrating trough and beneath a second one of said pair of magnetic separators.

17. The apparatus of claim 10 wherein said at least one perforated deck is inclined at an angle to a horizontal plane.

18. An apparatus for separating metallic material from a granulated stream of mixed metallic and nonmetallic material comprising:
    (a) a vibratory conveyor comprising a trough assembly mounted on a suspension system and coupled to a motor for causing the suspension system to vibrate, the trough assembly including upper and lower vibrating troughs extending parallel to one another, the upper trough including at least three gaps, each of a predetermined width;
    (b) first and second magnetic separators arranged at a first height above a first pair of said gaps in said upper trough; and
    (c) a third magnetic separator arranged above a third gap in said upper trough at a second height which is greater than said first height.

19. The apparatus of claim 18 wherein each of said magnetic separators comprises an endless belt sliding across a magnetic member positioned so as to span the width of a respective gap in said upper trough.

20. The apparatus of claim 18 wherein said lower trough is divided into a pair of lower trough portions wherein each lower trough portion conveys material to an output collection point.

21. The apparatus of claim 18 further including at least one declumping zone comprising at least one perforated deck situated at an input end of said vibratory conveyor and disposed in-line with said upper and lower troughs.

22. The apparatus of claim 21 wherein each of said magnetic separators includes means for adjusting the height of a magnet above said upper trough.

23. An apparatus for separating metals from nonmetals in a granular stream comprising:
  (a) a vibratory conveyor including a trough assembly suspended on springs and a motor for causing vibration of the trough assembly and having:
    (i) a first conveyor section including at least a pair of perforated decks, each of said perforated decks being pivotally mounted to said trough assembly and having a range of adjustment about a pivot point so as to permit said decks to be upwardly inclined, and
    (ii) a second section including an upper trough and a lower trough placed downstream of the first conveyor section, the upper trough having one or more gaps of a predetermined width so as to permit material to fall onto the lower trough, and
  (b) a magnetic separator positioned above each of said gaps in said upper trough.

24. An apparatus for separating metallic material from a granulated stream of mixed metallic and nonmetallic material comprising:
  (a) a vibratory conveyor comprising a trough assembly mounted on a suspension system and coupled to a motor for causing the suspension system to vibrate, the trough assembly including
    (i) upper and lower vibrating troughs extending parallel to one another, the upper trough including at least a pair of gaps of predetermined width, each of said troughs being arranged so as to feed a different output collection point,
    (ii) at least one declumping zone positioned between a pair of magnetic separators arranged above said gaps in said upper trough wherein said declumping zone comprises at least a pair of perforated deck elements, each having a slight angle of inclination with respect to a horizontal plane wherein said angle of inclination is adjustable.

25. An apparatus for apparatus for separating metals from nonmetals in a granular stream comprising:
  (a) a vibratory conveyor including a trough assembly suspended on springs and a motor for causing vibration of the trough assembly and having:
    (i) a first conveyor section including at least one perforated deck coupled to the trough assembly, the perforated deck having apertures of a predetermined size, and
    (ii) a second section having an upper trough and a lower trough placed downstream of the first conveyor section, the upper trough having one or more gaps of a predetermined width so as to permit material to fall onto the lower trough, and further including a vibratory sizing screen extending beneath at least one gap in said upper trough and above said lower trough, and
  (b) a magnetic separator positioned above each of said gaps in said upper trough.

26. The apparatus of claims 24 or 25 wherein said magnetic separator includes a magnet member and an endless belt moving in the same direction as the direction of material flow along said vibratory conveyor, the endless belt positioned so as to slide over the magnet member, the magnet member being positioned above and substantially spanning the width of each gap in said upper trough.

* * * * *